United States Patent
Ali (10) Patent No.: US 7,328,327 B2
(45) Date of Patent: Feb. 5, 2008

(54) TECHNIQUE FOR REDUCING TRAFFIC IN AN INSTRUCTION FETCH UNIT OF A CHIP MULTIPROCESSOR

(75) Inventor: Abid Ali, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 67 days.

(21) Appl. No.: 11/329,582

(22) Filed: Jan. 11, 2006

(65) Prior Publication Data

US 2007/0162723 A1 Jul. 12, 2007

(51) Int. Cl.
*G06F 9/30* (2006.01)

(52) U.S. Cl. ........................ 712/205; 712/207

(58) Field of Classification Search .................. None
See application file for complete search history.

(56) References Cited

U.S. PATENT DOCUMENTS

| | | | |
|---|---|---|---|
| 6,240,502 B1 | 5/2001 | Panwar et al. | |
| 6,675,376 B2 * | 1/2004 | Ronen et al. | 717/151 |
| 6,954,846 B2 | 10/2005 | Leibholz et al. | |
| 6,983,359 B2 * | 1/2006 | Miller | 712/228 |
| 7,143,267 B2 * | 11/2006 | Fluhr et al. | 712/207 |

OTHER PUBLICATIONS

Shen, John Paul, Lipasti, Mikko H. "Modern Processor Design: Fundamentals of Superscalar Processors" McGraw-Hill Science, 1st edition, Jul. 7, 2004, pp. 584-588.*

Oberoi, Paramjit, Sohi, Gurindar. "Out-of-order instruction fetch using multiple sequencers" In Proceedings of the Intl. Conference on Parallel Processing, pp. 14-26, Aug. 2002.*

* cited by examiner

*Primary Examiner*—Eddie Chan
*Assistant Examiner*—Jacob Petranek
(74) *Attorney, Agent, or Firm*—Dorsey & Whitney LLP (57) ABSTRACT

A processor includes a fetch pipeline, out-of-order (OOO) logic and a strand selector. The fetch pipeline is configured to provide instructions from an instruction store to a fetch buffer responsive to receiving a plurality of fetch requests for a first strand, selected from a plurality of active strands. The OOO logic is coupled to the fetch pipeline and is configured to detect an OOO packet in the fetch pipeline in response to the fetch requests for the first strand. The strand selector is coupled to the OOO logic and the fetch pipeline and selects a second strand for processing in the fetch pipeline, from the active strands, when the OOO logic detects the OOO packet associated with the first strand.

18 Claims, 6 Drawing Sheets

TECHNIQUE FOR REDUCING TRAFFIC IN AN INSTRUCTION FETCH UNIT OF A CHIP MULTIPROCESSOR

CROSS-REFERENCE TO RELATED APPLICATION(S)

BACKGROUND

1. Field of the Invention

The invention generally relates to the field of computers and, more particularly, to computer architecture.

2. Description of the Related Art

Early computer processors (also called microprocessors) included a single central processing unit (CPU) or instruction execution unit that executed only one instruction at a time. As is well known, an execution unit executes programs having instructions stored in main memory by fetching instructions of the program, decoding the instructions, and executing the instructions one after the other. In response to the need for improved performance, several techniques, e.g., pipelining, superpipelining, superscaling, speculative instruction execution and out-of-order instruction execution, have been implemented to extend the capabilities of early processors.

Pipelined architectures break the execution of instructions into a number of stages, where each stage corresponds to one step in the execution of the instruction. Pipelined designs increase the rate at which instructions can be executed by allowing a new instruction to begin execution before a previous instruction is finished executing. Pipelined architectures have been extended to superpipelined or extended pipeline architectures, where each execution pipeline is broken down into even smaller stages. Superpipelining increases the number of instructions that can be executed in the pipeline at any given time.

Superscalar processors generally refer to a class of microprocessor architectures that include multiple pipelines that process instructions in parallel. Superscalar processors typically execute more than one instruction per clock cycle, on average. Superscalar processors allow parallel instruction execution in two or more instruction execution pipelines. In this manner, the number of instructions that may be processed is increased due to parallel execution. Each of the execution pipelines may have differing number of stages. Some of the pipelines may be optimized for specialized functions, such as integer operations or floating point operations, and in some cases execution pipelines are optimized for processing graphic, multimedia, or complex math instructions.

The goal of superscalar and superpipeline processors, is to execute multiple instructions per cycle (IPC). Instruction-level parallelism (ILP) available in programs written to operate on the processor can be exploited to realize this goal. However, many programs are not coded in a manner that can take full advantage of deep, wide instruction, execution pipelines in modern processors. Many factors, such as low cache hit rate, instruction interdependency, frequent access to slow peripherals and branch mispredictions cause the resources of a superscalar processor to be used inefficiently.

Superscalar architectures require that instructions be dispatched for execution at a sufficient rate. Conditional branching instructions create a problem for instruction fetching because an instruction fetch unit (IFU) cannot know with certainty which instructions to fetch, until conditional branch instructions are resolved. Also, when a branch is detected, the target address of the instructions following the branch must be predicted to supply those instructions for execution.

Various processor architectures have used a branch prediction unit to predict the outcome of branch instructions, allowing the IFU to fetch subsequent instructions according to the predicted outcome. These instructions are speculatively executed to allow the processor to make forward progress during the time the branch instruction is resolved.

Another technique to increase processing power is provided by multiprocessing. Multiprocessing is a hardware and operating system (OS) feature that allows multiple processors to work together to share workload within a computing system. In a shared memory multiprocessing system, all processors have access to the same physical memory. One limitation of multiprocessing is that programs that have not been optimized to run as multiple processes may not realize significant performance gain from multiple processors. However, improved performance is achieved where the OS is able to run multiple programs concurrently, each running on a separate processor.

Multithreaded software is a recent development that allows applications to be split into multiple independent threads, such that each thread can be assigned to a separate processor and executed independently in parallel as if the thread were a separate program. The results of these separate threads are reassembled to produce a final result. By implementing each thread on a separate processor, multiple tasks are handled in a fast, efficient manner. The use of multiple processors allows various tasks or functions to be handled by other than a single CPU so that the computing power of an overall computer system is enhanced. However, because conventional multiprocessors are implemented using a plurality of discrete integrated circuits, communication between the devices limits system clock frequency and the ability to share resources between processors. As a result, conventional multiprocessor architectures result in duplication of resources which increases cost and complexity.

In order to, for example, reduce duplication of resources, various designers have implemented chip multiprocessors (CMPs). A CMP is essentially a symmetric multi-processor (SMP) implemented on a single integrated circuit. Similar to an OS for an SMP system, an OS for a CMP is required to schedule and coordinate system resources for processor cores of the CMP. In a typical case, multiple processor cores of the CMP share memory, of a memory hierarchy, and various interconnects. In general, a computer system that implements one or more CMPs allows for increased thread-level parallelism (TLP). As is well know, threads include instruction sequences, derived from a program, that perform divisible tasks. OSs generally implement threads in one of two ways: preemptive multithreading or cooperative multithreading. In preemptive multithreading, an OS determines when a context switch should occur. In contrast, cooperative multithreading relies on the threads themselves to relinquish control once the threads are at a stopping point. This can create problems if a thread is waiting for a resource to become available. A disadvantage of preemptive multithreading is that the OS may make a context switch at an inappropriate time, causing priority inversion or other undesirable effects, which may be avoided by cooperative multithreading.

In at least one CMP, a single instruction fetch unit (IFU) has been utilized to service multiple processor cores. In a typical situation, each of the processor cores or strands may initiate multiple fetch requests. Depending upon whether a cache miss occurs, a packet may return out-of-order. In a typical situation, an out-of-order (OOO) packet may be detected and replayed through an IFU pipeline until an in-order packet is received and reaches a fetch buffer. Unfortunately, repeatedly replaying an OOO packet may cause various problems, such as excessive IFU traffic, increased turn-around time on token rotation through fetcher arbiters and unnecessary switching (resulting in increased power consumption) within the processor cores.

What is needed is a technique for handling out-of-order packets that reduces out-of-order packet replay.

SUMMARY

Various embodiments of the present invention are directed to a technique for reducing traffic in an instruction fetch unit (IFU) of a chip multiprocessor (CMP). The IFU may comprise a fetch pipeline, out-of-order (OOO) logic and a strand selector. The IFU is configured to provide instructions from an instruction store to a fetch buffer responsive to receiving a plurality of fetch requests for a first strand, selected from a plurality of active strands. The OOO logic is configured to detect an OOO packet in response to the fetch request for the first strand. The strand selector is coupled to the OOO logic and selects a second strand from the active strands when the OOO logic detects the OOO packet associated with the first strand. The instruction store may be an L1 cache memory and, in this case, the OOO packet is indicative of a cache miss in the L1 cache memory. In one embodiment, each of the strands may issue up to two fetch requests per cycle. In this case, both of the two fetch requests may result in cache misses or one of the two fetch requests may result in a cache miss. In at least one embodiment, the active strands include eight strands.

According to various other aspects of the present invention, the OOO packet is detected in a final fetch stage of the pipeline. The IFU may further comprise a miss buffer, coupled to the strand selector and the OOO logic. The OOO logic provides an OOO packet indication to the strand selector that causes the strand selector to lock replay of the OOO packet, pending receipt of an in-order packet for the first strand. The miss buffer provides a data return signal to the strand selector and the OOO logic when the in-order packet for the first strand returns, which causes the strand selector to allow replay of the OOO packet.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

In a computer system that includes multiple processing units (or processor cores), each processing unit or strand of the computer system may be configured to issue multiple fetch requests at a time. The fetch requests may become out-of-order (OOO), depending upon whether requested instruction packets are located within an instruction cache memory, e.g., an L1 cache. For example, assuming a strand issues two fetch requests that both miss an instruction cache, data return from an L2 cache can still be OOO if a second instruction packet returns before a first instruction packet. According to various aspects of the present invention, receipt of an OOO packet is detected in a fourth stage (F3 stage) of a fetch pipeline of an instruction fetch unit (IFU). In a traditional IFU, the OOO packet has been repeatedly replayed through the fetch pipeline until an in-order packet is returned and reaches the fetch buffer. It should be appreciated, as noted above, that this may cause several problems, e.g., excessive fetch pipeline traffic, increased turn-around time on strand servicing rotation and may result in unnecessary switching of logic within a processor core.

Figure 1:
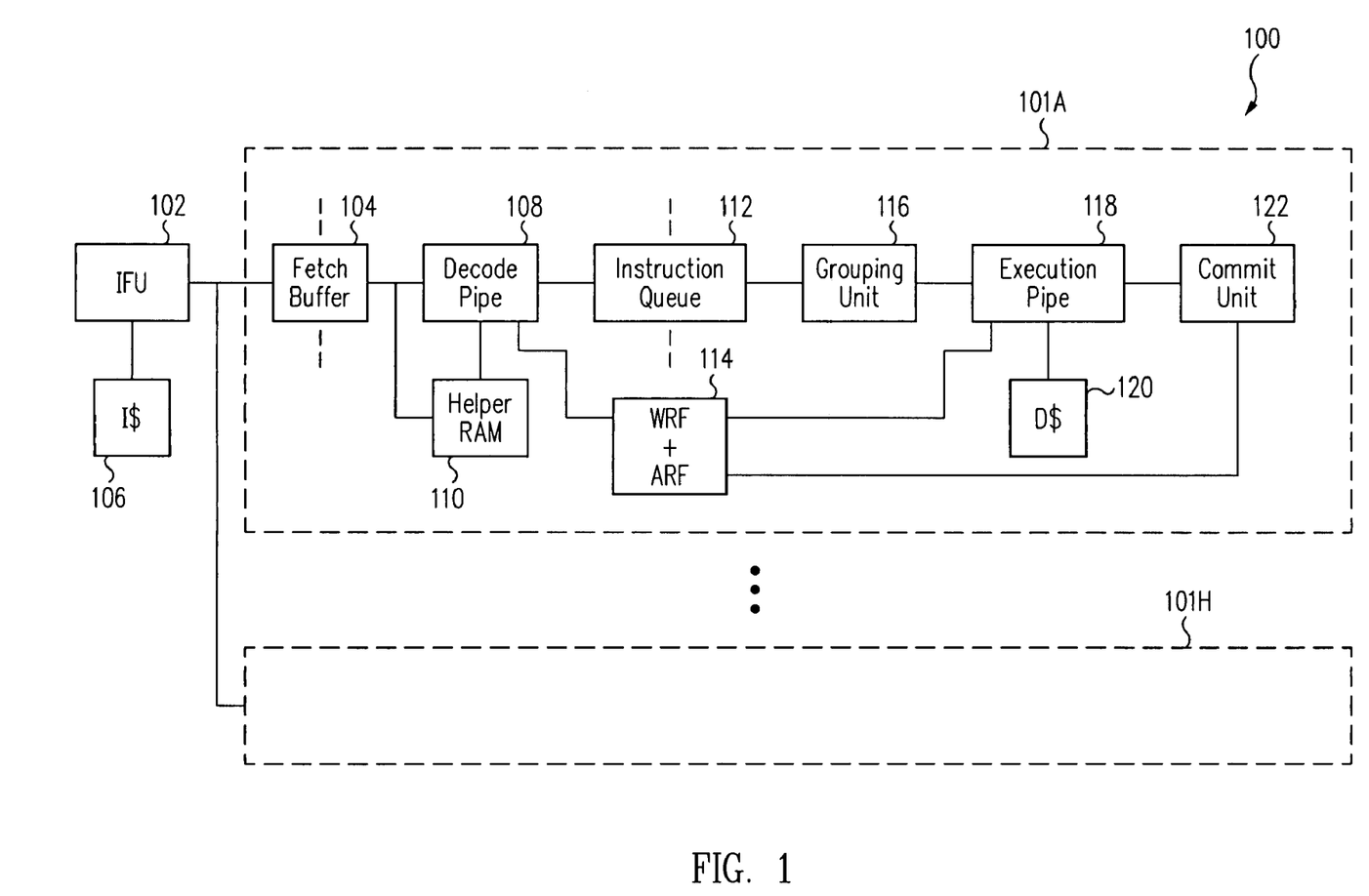
FIG. 1 depicts a block diagram of a relevant portion of an exemplary processor, constructed according to one embodiment of the present invention.

With reference to FIG. 1, a relevant portion of an exemplary chip multiprocessor (CMP) 100, having pipelined processor cores 101A-101H, is depicted. For example, the CMP 100 may include eight pipelined cores 101A-101H, with each core 101A-101H handling up to two strands of traffic. The cores 101A-101H share a common instruction fetch unit (IFU) 102, which is coupled to a common instruction cache 106. It should be understood that an exemplary computer system may implement more or less than eight processor cores. For example, a computer system may implement four processor cores each having multiple processor pipelines, e.g., four pipelines per core, on a single integrated circuit (IC) and may include multiple of such ICs. An output of the IFU 102 is provided to a pipeline specific fetch buffer 104, which functions to decouple the IFU 102 from subsequent pipes in the respective pipelined processor core 101A-101H.

As is also shown in FIG. 1 a helper store 110, e.g., a programmable helper random access memory (RAM), is coupled to an output of the fetch buffer 104. The sequences, when appropriate, to decode pipe 108. The helper store 110 may also include logic for disabling the issuance of traps and interrupts from, for example, a trap unit (not shown). In general the helper store 110 implements instructions that for various reasons, designers of the CMP 100 decided not to implement directly in hardware. As is usual, the decode pipe 108 includes one or more stages that function to decode instructions. The decode pipe 108 is coupled to the instruction queue 112, which may also serve to decouple the decode pipe 108 from later stages of the respective pipelined processor core 101A-101H. A register file 114, including, for example, a working register file (WRF) and an architectural register file (ARF), is coupled to the decode pipe 108, an execution pipe 118 and a commit unit 122. It should be appreciated that while the WRF and ARF are shown combined, the WRF and ARF may be, in fact, implemented as separate files for each of the pipelines 101A-101H.

The instructions from the instruction queue 112 may be grouped, by grouping unit 116, for execution by the execution pipe 118. The execution pipe 118 is coupled to the commit unit 122, which commits executed instructions to architectural state in the ARF. A data cache 120 provides data to the execution pipe 118. It should be appreciated that traffic for an IFU that can handle multiple strands (e.g., eight strands, with each strand being capable of sending multiple fetch requests) can be relatively heavy, when all eight strands are running. As is noted above, replaying out-of-order (OOO) packets may cause several problems, such as preventing a strand that could run from running through the fetch pipeline earlier in time. As noted above, power dissipation may also be increased due to unnecessary switching. Furthermore, deadlock may result due to OOO packet recycling through the fetch pipeline when an empty F0 stage is not available for an in-order packet.

According to various aspects of the present invention, an OOO packet is prevented from being replayed through the fetch pipeline until and in-order packet is received. In at least one embodiment, a state element is implemented (within, for example, a strand selector) to track OOO packet receipt for a particular strand after a first pass through the fetch pipeline. An OOO replay lock is then asserted responsive to the OOO packet receipt. The OOO replay lock is then removed on data return of an associated in-order packet from, for example, an L2 cache.

Figure 2:
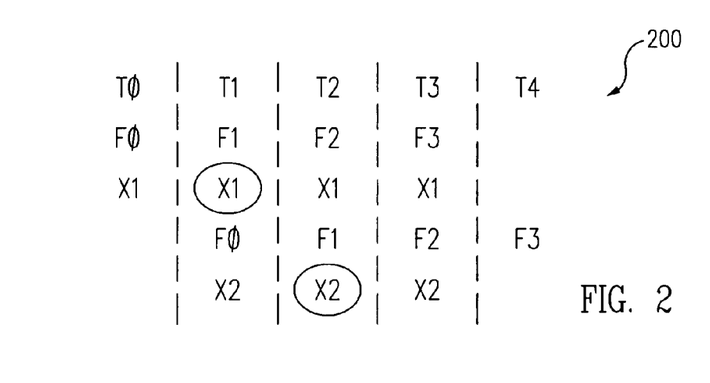
FIG. 2 is a diagram depicting stages of an instruction fetch unit (IFU) pipeline having four fetch stages with a cache miss occurring at stage F1 for a first packet and a second packet.

With reference to FIG. 2, a diagram 200 depicts a situation where a cache miss associated with the first packet X1 is detected (during stage F1) at a time T1 and a cache miss associated with a packet X2 is detected (during stage F1) at time T2. The packets X1 and X2 may be, for example, sixty-four bytes in length to provide sixteen four-byte instructions for each of the two fetch requests. The diagram 200 corresponds to a miss-miss case, i.e., when both packets X1 and X2 associated with related fetch requests are not present in an L1 cache.

Figure 3:
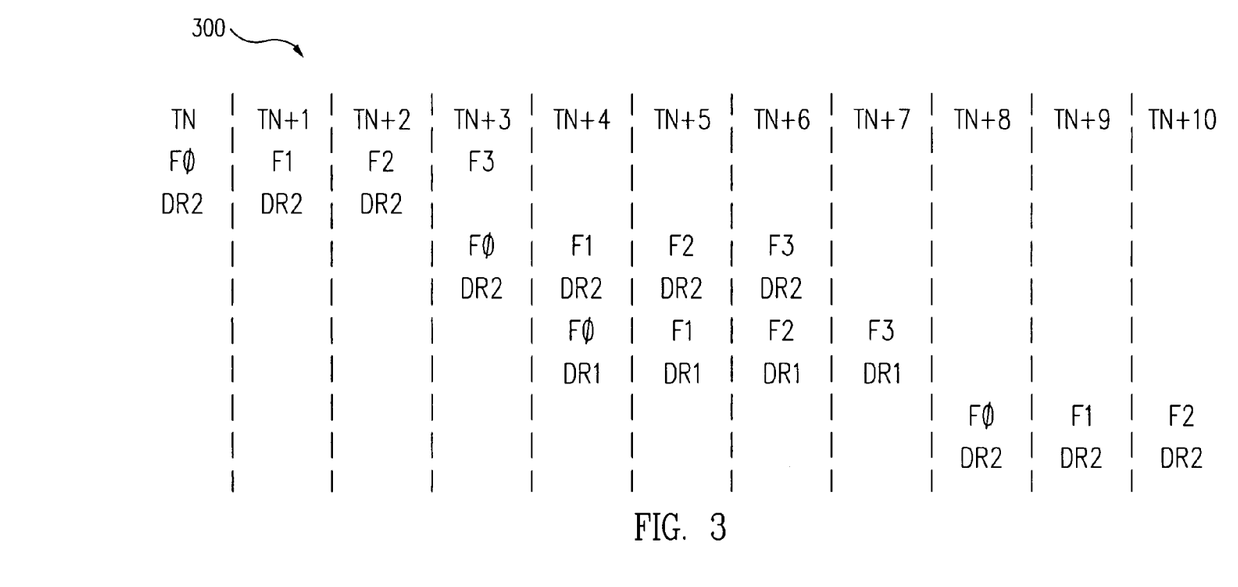
FIG. 3 is a diagram depicting cycling of an out-of-order (OOO) packet DR2, returned before an in-order packet DR1, through the fetch stages of an IFU.

With reference to FIG. 3, a diagram 300 depicts the case when an out-of-order (OOO) packet is received and a fetch pipeline is configured to replay an OOO packet, until an in-order packet is received. As is shown in FIG. 3, at a time TN, an OOO packet DR2 is received and processed (time TN+1 and time TN+2) through the fetch pipeline. At stage F3 (time TN+3), the fetch pipeline determines that the packet is out-of-order and, thus, signals replay, which begins at time TN+3. At time TN+4 an in-order packet DR1 is received. However, due to the nature of the fetch pipeline, the OOO packet DR2 cannot again begin processing until time TN+8, which is after the time in which the fetch pipeline has determined, at time TN+7, that an in-order packet has been received. Thus, it should be appreciated that latency associated with packet processing is increased. It should also be appreciated that an unrelated strand having one or more in-order packets may have been able to utilize the fetch pipeline while an OOO packet associated with another strand was replaying through the fetch pipeline.

Figure 4:
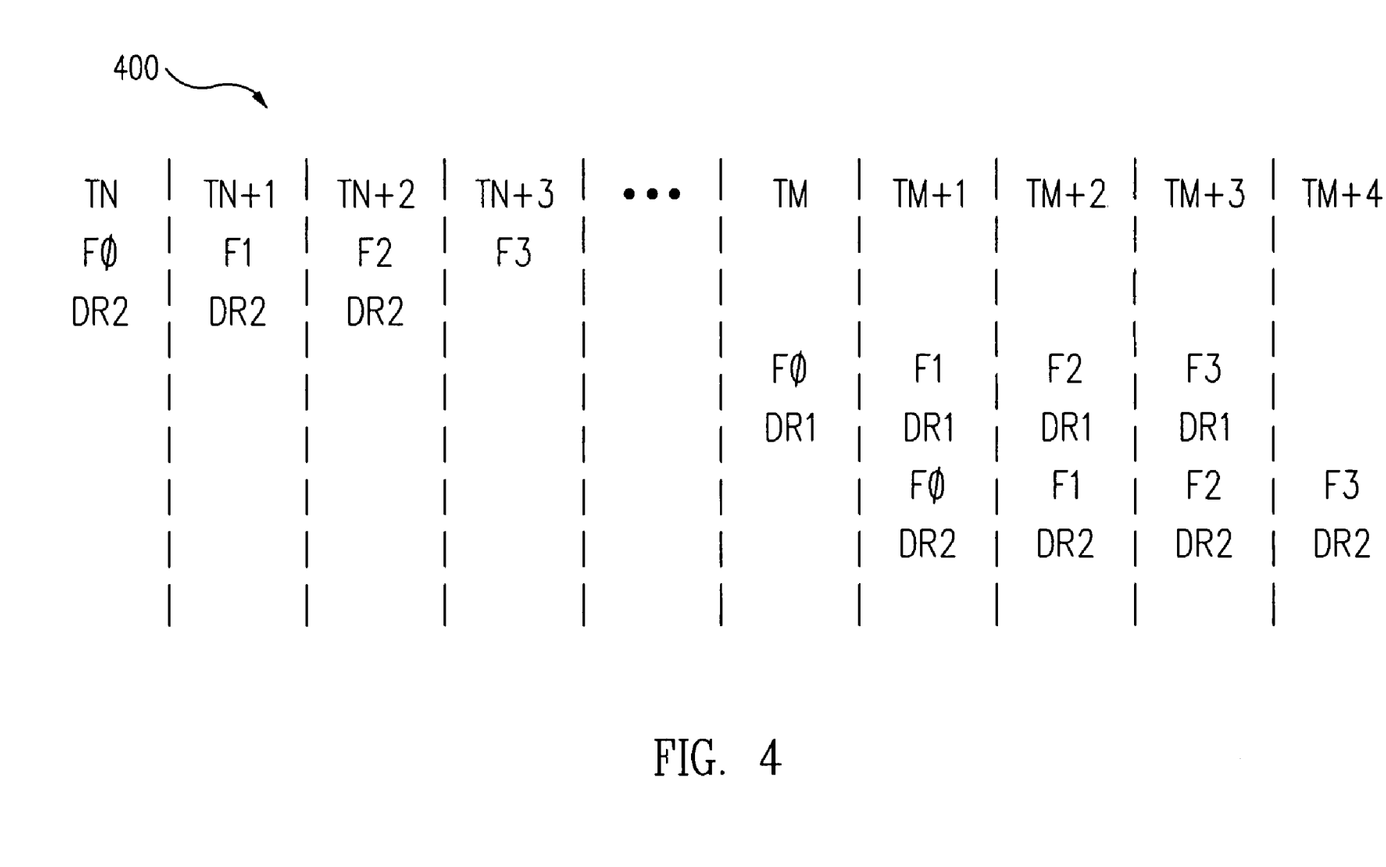
FIG. 4 is a diagram of fetch stages of an IFU that asserts a replay lock on an OOO packet DR2, received before an in-order packet DR1, and subsequent replay of the OOO packet DR2 after receipt of the in-order packet DR1, according to an embodiment of the present invention.

According to one aspect of the present invention, and with reference to FIG. 4, the diagram 400 depicts a situation wherein an out-of-order (OOO) packet is detected at time TN+3, at which point replay of the OOO packet is locked. At a later time TM, when an in-order packet is received, the replay lock on the OOO packet is released and, as such, the OOO packet DR2 can begin processing through the fetch pipeline in a next time slot TM+1, thus, reducing latency associated with the packet DR2 after the in-order packet DR1 is received. It should be appreciated that the time period between detection of the OOO packet at time TN+3 and receipt of the in-order packet at time TM may be utilized by another strand and, thus, in this manner the efficiency of the fetch pipeline may be improved.

Figure 5:
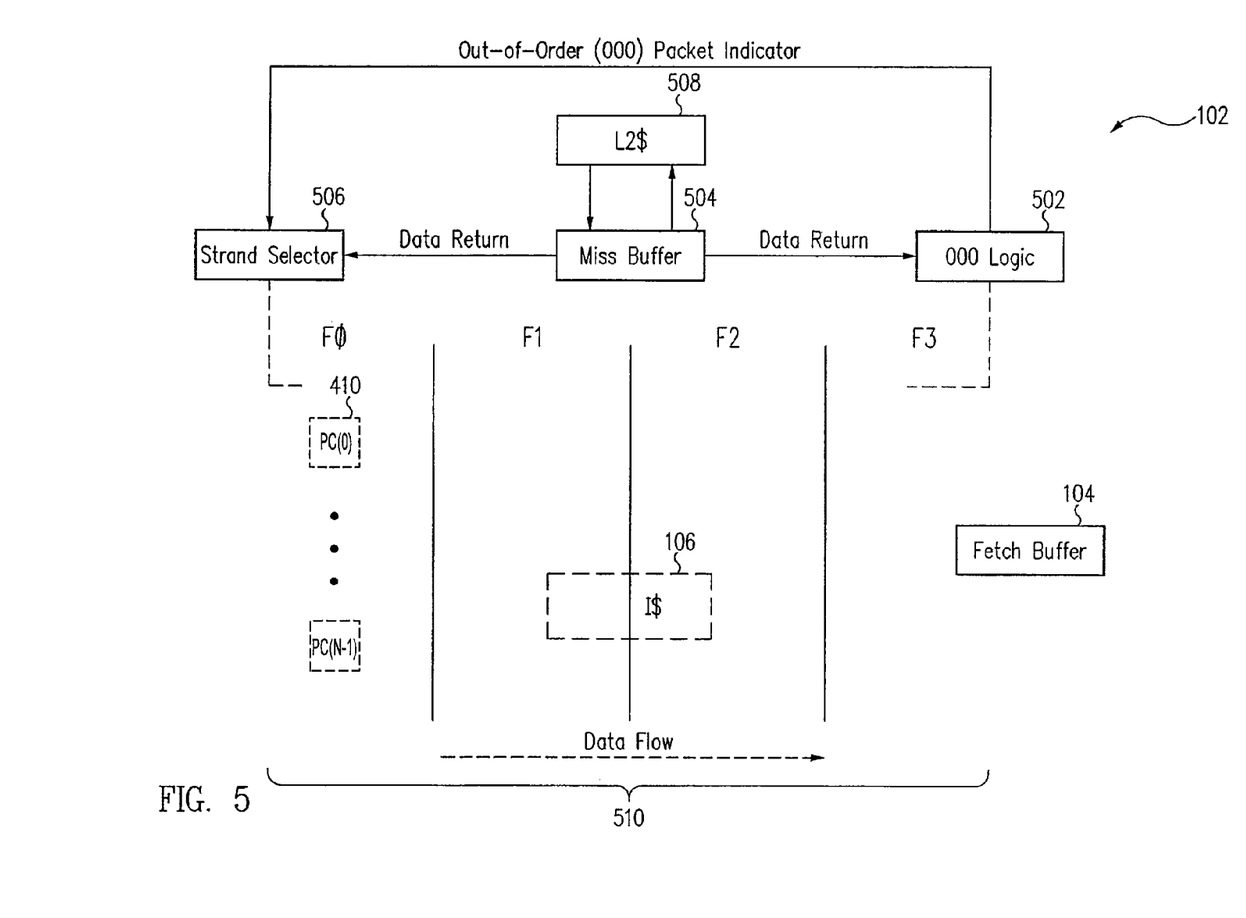
FIG. 5 is a block diagram of a relevant portion of an IFU constructed, according to one embodiment of the present invention.

With reference to FIG. 5, an exemplary block diagram of relevant portions of the IFU 102 are further depicted. The IFU 102 includes a strand selector 506, a miss buffer 504 and out-of-order (OOO) logic 502. The miss buffer 504 is coupled to an L2 cache 508 and provides a data return signal to the OOO logic 502 and the strand selector 506. The OOO logic 502 is coupled to the strand selector 506 and provides an OOO packet indicator to the strand selector 506, upon detection of an OOO packet, at stage F3 of the fetch pipeline 510. As is illustrated, data flows through stages F0-F3 of the fetch pipeline 510 to an appropriate one of the fetch buffers 104. Each of the strands associated with a processing unit includes a unique program counter (PC) 410. For example, in a processor that includes N strands, N program counters PC(0)-PC(N-1) are provided, each of which provides addresses for a particular strand. It should also be appreciated that the fetch buffer 104 includes a fetch buffer for each strand. With reference to FIG. 1, the IFU 102 and the instruction cache 106 are common to all of the cores 101A-101H.

Figure 6:
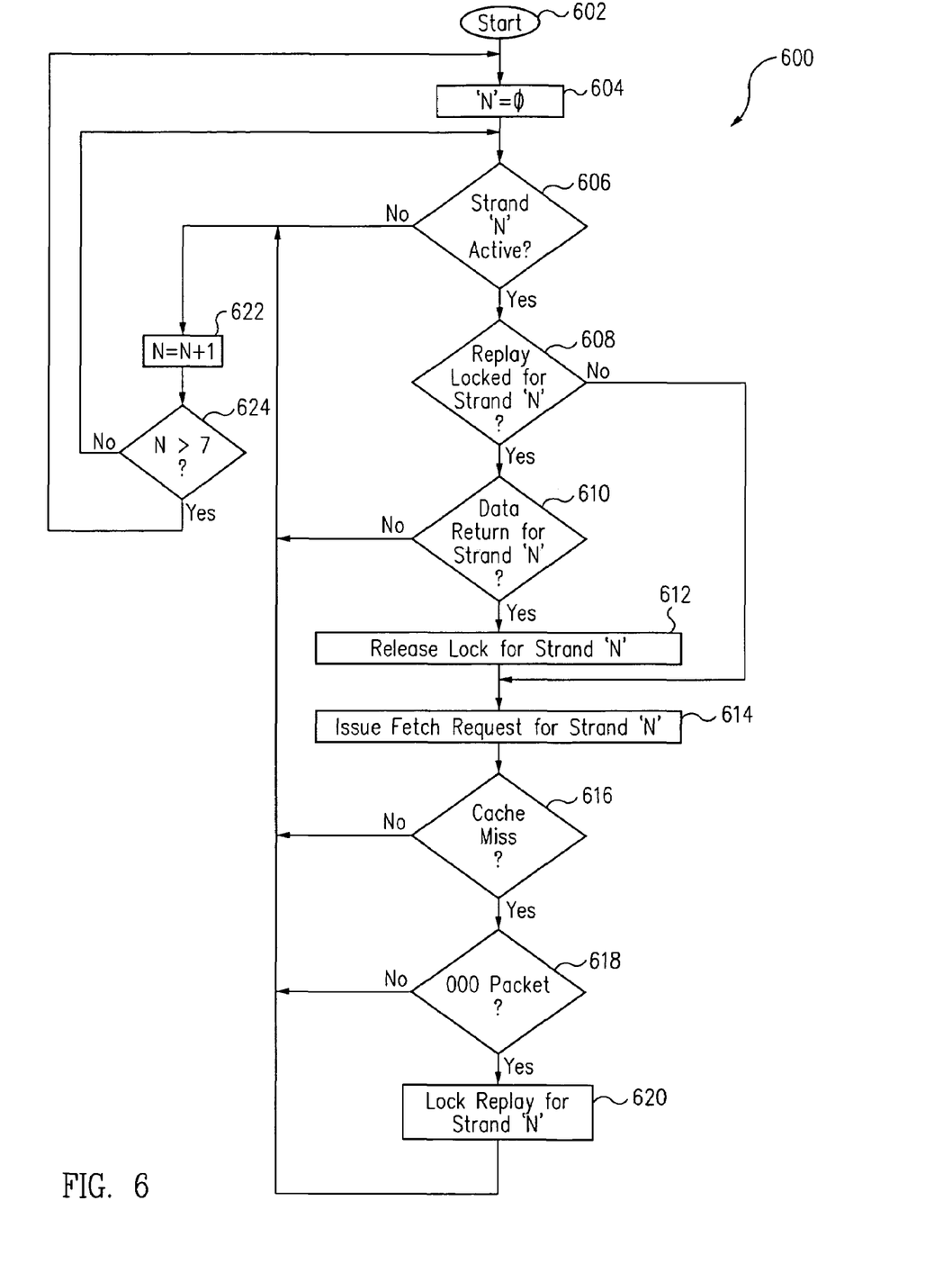
FIG. 6 is a flow chart of an exemplary process for operating an IFU, according to one aspect of the present invention.

Turning to FIG. 6, an exemplary process 600, that prevents replay of an out-of-order (OOO) packet until receipt of an associated in-order packet, is depicted. Upon initiation of the process 600 in block 602, control transfers to block 604, where a variable 'N', which tracks a currently serviced strand, is set to a default value, e.g., zero. Next, in decision block 606 it is determined whether strand 'N' is active. If not, control transfers to block 622, where 'N' is incremented. Next, in decision block 624 it is determined whether 'N' has exceeded a set value, in this case 7. If so, control transfers to block 604, where the variable 'N' is set to a default value. Otherwise, control transfers to decision step 606, where it is determined whether the strand 'N' is active. If strand 'N' is active in block 606, control transfers to decision block 608, where it is determined whether replay is locked for strand 'N'. If so, control transfers to decision block 610, where it is determined whether data return for strand 'N' has occurred. If so, control transfers to step 612, where the lock for strand 'N' is released.

Next, in block 614, fetch requests for strand 'N' are issued. Returning to decision block 608, when replay is not locked for strand 'N', control transfers to block 614. Returning to block 610 when data has not returned for strand 'N' control transfers to block 622, where 'N' is incremented such that a next strand can be serviced, if the next strand is active. From block 614 control transfers to decision block 616, where it is determined whether a cache miss has occurred. It should be appreciated that an OOO packet cannot occur unless a cache miss occurs. In a typical situation a cache miss for first and second packets (or a cache miss for a first packet and a cache hit for a second packet) may result in receipt of an OOO packet. When a cache miss occurs control transfers to decision block 618, where it is determined (in, for example, an F3 stage of the fetch unit) whether an OOO packet has been retrieved. If an OOO packet has been retrieved, control transfers to block 620, where replay is locked for strand N. Otherwise, control transfers from block 618 to block 622.

As mentioned above, the OOO logic 502 provides an OOO packet indicator to the strand selector 506 to inhibit further strand selection of the strand (with the OOO packet) until a data return is received for the OOO packet. For example, assuming fetch requests by a first strand results in receipt of an OOO packet, the IFU 102 may then service a second strand. Assuming that none of the packets returned for the second strand are out-of-order, i.e., a cache miss has not occurred, the second strand is serviced and control transfers to a next active strand. Assuming that no other strands are currently active, the IFU 102 returns to servicing fetch requests of the first strand, assuming that a data return signal has been received for the first strand. In that event, and with reference to FIG. 4, data return of the first packet DR1 is processed through the fetch pipeline 510 at which point the OOO packet DR2 is processed through the fetch pipeline 510.

Figure 7:
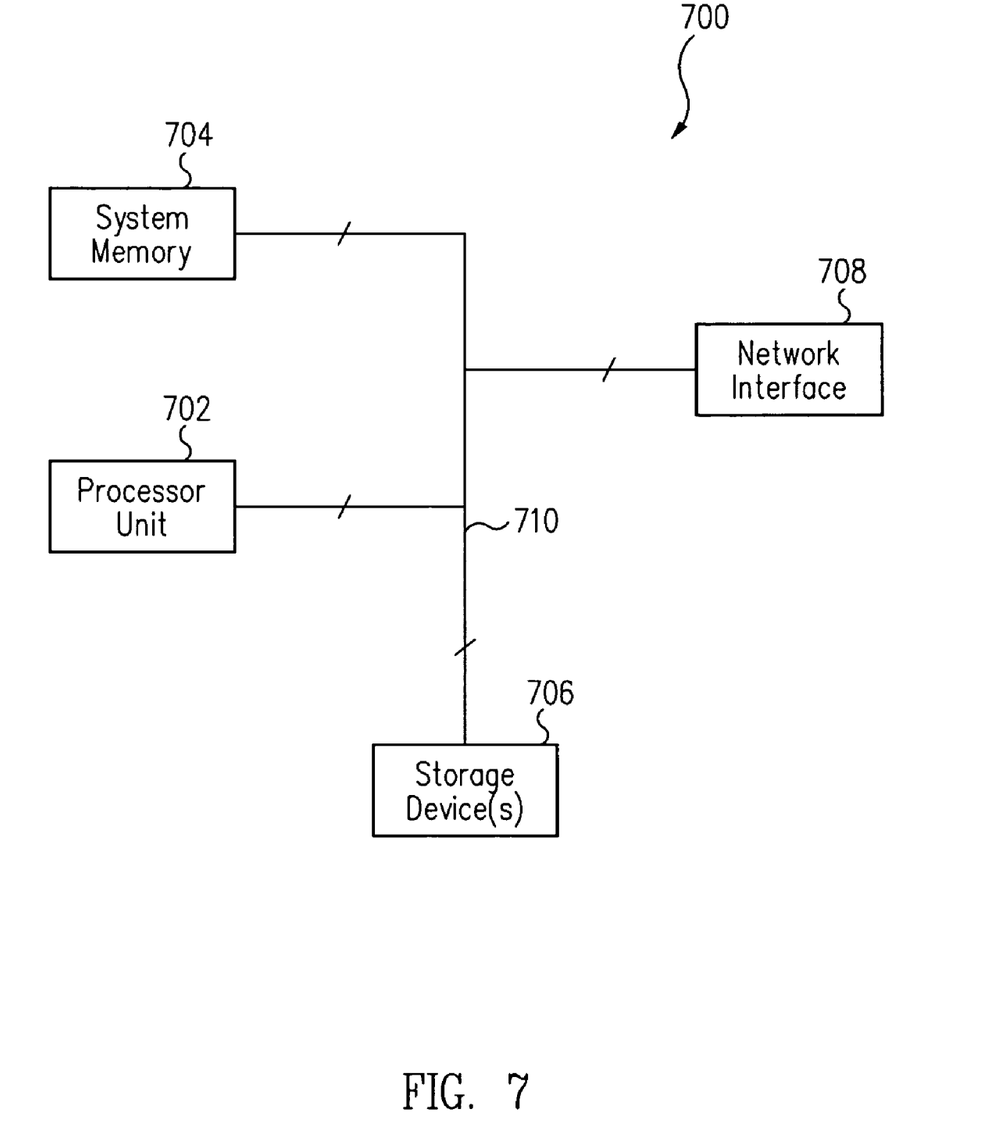
FIG. 7 is an electrical block diagram of an exemplary computer system that may be configured according to the present invention.

FIG. 7 depicts an exemplary computer system 700 constructed according to various aspects of the present invention. The computer system 700 includes a processor unit 702, which may be configured as a chip multiprocessor (CMP) 100. The computer system 700 also includes a system memory 704 (e.g., one or more cache levels, SRAM, DRAM, RDRAM, EDO RAM, DDR RAM, and/or EEPROM, etc.), a system bus 710 (e.g., LDT, PCI, ISA, etc.), a network interface 708 (e.g., an ATM interface, an Ethernet interface, a Frame Relay interface, etc.), and storage device(s) 706 (e.g., optical storage, magnetic storage, etc.). Computer system realizations of the invention may include fewer or additional components not illustrated in FIG. 7. For example, the system 700 may also include video cards, audio cards, additional network interfaces, peripheral devices, etc. The processor unit 702, the storage device(s) 706, the network interface 708 and the system memory 704 are coupled to the system bus 710, which includes a plurality of address, data and control lines. The processor unit 702 includes a memory interface that couples the instruction store 106 to a memory hierarchy, i.e., the system memory 704.

Accordingly, a technique has been described herein for reducing traffic in an instruction fetch unit (IFU) of a processor. As noted above, reducing out-of-order traffic is advantageous in that it increases efficiency of the IFU in that the IFU is no longer servicing out-of-order packets and, thus, is available to service active strands within the processor.

What is claimed is:

1. A method for reducing traffic in an instruction fetch unit (IFU) of a chip multiprocessor (CMP), comprising:
   issuing a plurality of fetch requests for a first strand selected from a plurality of active strands;
   detecting an out-of-order (OOO) packet in response to the fetch requests for the first strand;
   servicing a second strand selected from the active strands upon detecting the OOO packet associated with the first strand;
   locking replay of the OOO packet pending receipt of an in-order packet for the first strand; and
   replaying the OOO packet upon receipt of the in-order packet for the first strand.

2. The method of claim 1, wherein the OOO packet is indicative of a cache miss.

3. The method of claim 1, wherein each of the strands issues up to two fetch requests per cycle.

4. The method of claim 3, wherein both of the two fetch requests result in cache misses.

5. The method of claim 3, wherein one of the two fetch requests result in a cache miss.

6. The method of claim 1, wherein the active strands include eight strands.

7. The method of claim 1, wherein the OOO packet is detected in a final fetch stage of the IFU.

8. A processor, comprising:
   a fetch pipeline configured to provide instructions from an instruction store to a fetch buffer responsive to receiving a plurality of fetch requests for a first strand selected from a plurality of active strands;
   out-of-order (OOO) logic for detecting an OOO packet in the fetch pipeline in response to the fetch requests for the first strand, wherein the OOO logic is coupled to the fetch pipeline;
   a strand selector coupled to the OOO logic and the fetch pipeline, wherein the strand selector selects a second strand from the active strands for processing in the fetch pipeline when the OOO logic detects the OOO packet associated with the first strand; and
   a miss buffer coupled to the strand selector and the OOO logic, wherein the OOO logic provides an OOO packet indication to the strand selector that causes the strand selector to lock replay of the OOO packet through the fetch pipeline pending receipt of an in-order packet for the first strand, and wherein the miss buffer provides a data return signal to the strand selector and the OOO logic when the in-order packet for the first strand returns which causes the strand selector to allow replay of the OOO packet.

9. The processor of claim 8, wherein the instruction store is an L1 cache memory and the OOO packet is indicative of a cache miss in the L1 cache memory.

10. The processor of claim 8, wherein each of the strands issues up to two fetch requests per cycle.

11. The processor of claim 10, wherein both of the two fetch requests result in cache misses.

12. The processor of claim 10, wherein one of the two fetch requests result in a cache miss.

13. The processor of claim 8, wherein the active strands include eight strands.

14. The processor of claim 8, wherein the OOO packet is detected in a final fetch stage of the fetch pipeline.

15. A computer system, comprising:
   a fetch pipeline configured to provide instructions from an instruction store to a fetch buffer responsive to receiving a plurality of fetch requests for a first strand selected from a plurality of active strands;
   out-of-order (OOO) logic for detecting an OOO packet in the fetch pipeline in response to the fetch requests for the first strand, wherein the OOO logic is coupled to the fetch pipeline;
   a strand selector coupled to the OOO logic and the fetch pipeline, wherein the strand selector selects a second strand from the active strands for processing in the fetch pipeline when the OOO logic detects the OOO packet associated with the first strand; and
   a miss buffer coupled to the strand selector and the OOO logic, wherein the OOO logic provides an OOO packet indication to the strand selector that causes the strand selector to lock replay of the OOO packet pending receipt of an in-order packet for the first strand, and wherein the miss buffer provides a data return signal to the strand selector and the OOO logic when the in-order packet for the first strand returns which causes the strand selector to allow replay of the OOO packet.

16. The system of claim 15, wherein the instruction store is an L1 cache memory and the OOO packet is indicative of a cache miss in the L1 cache memory.

17. The system of claim 15, wherein each of the strands issues up to two fetch requests per cycle.

18. The system of claim 15, wherein the OOO packet is detected in a final fetch stage of the fetch pipe.

* * * * *